Patented Oct. 31, 1922.

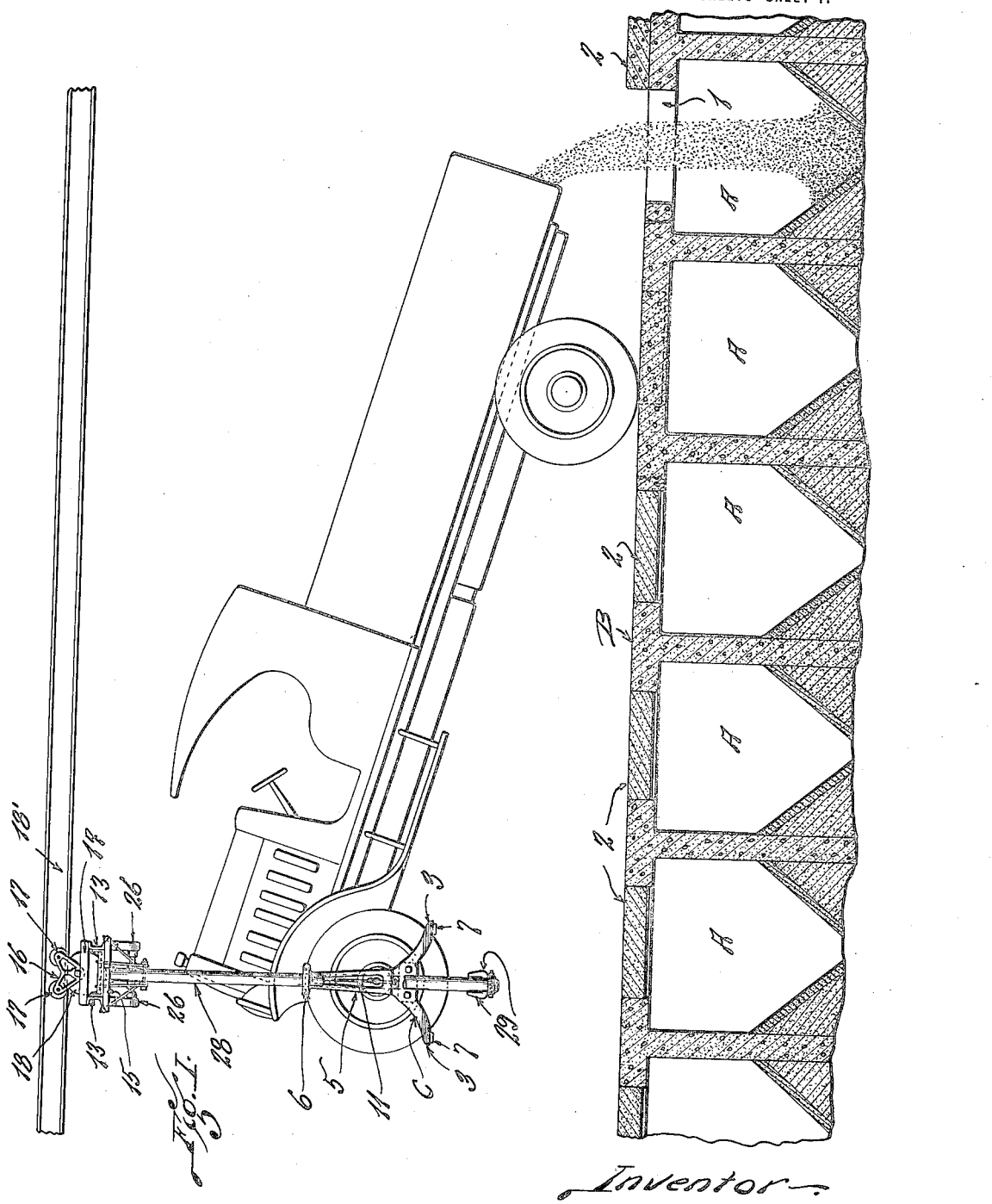

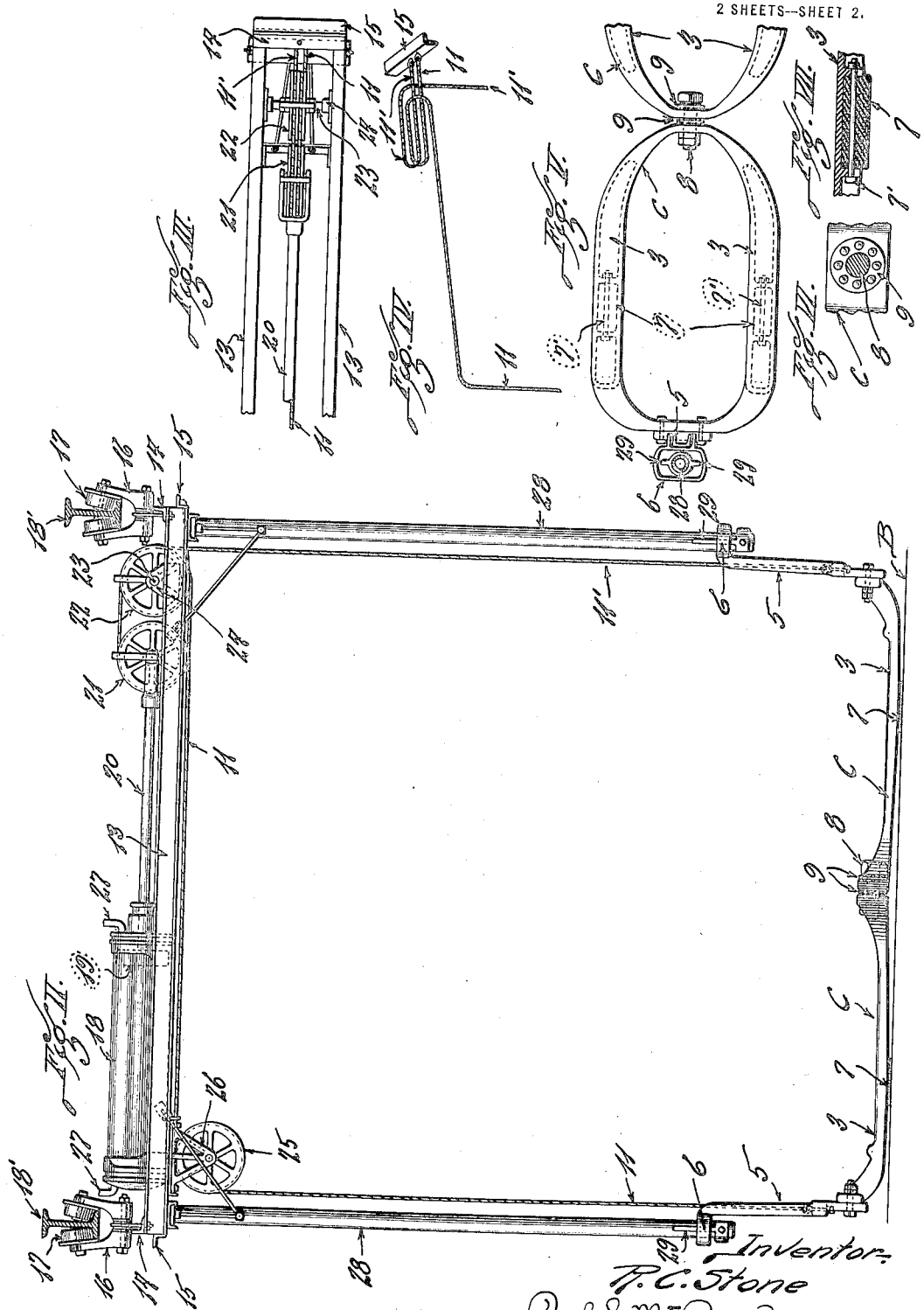

1,434,030

UNITED STATES PATENT OFFICE.

RICHARD C. STONE, OF ST. LOUIS, MISSOURI.

VEHICLE DUMPING APPARATUS.

Application filed November 3, 1920. Serial No. 421,504.

*To all whom it may concern:*

Be it known that I, RICHARD C. STONE, a citizen of the United States of America, a resident of the city of St. Louis, in the State of Missouri, have invented certain new and useful Improvements in Vehicle Dumping Apparatus, of which the following is a full, clear, and exact description, reference being had to the accompanying drawings, forming a part of this specification.

This invention relates to improvements in vehicle dumping apparatus adapted to tilt motor trucks, horsedrawn wagons, and other vehicles for the purpose of unloading their contents. The new apparatus is especially adapted for use in grain elevators where it is desirable to dump the grain into different bins, or the like, located beneath a driveway.

Prior to this invention, grain elevators have been provided with tilting beams or logs, forming tracks for the vehicle to be unloaded, such beams being movable from positions flush with the driveway to inclined positions wherein they support the vehicle in an inclined position to discharge its contents. These ordinary tilting beams are permanently located at points adjacent to the bin below the driveway, and if the vehicles are to discharge directly into different bins, it is necessary to use a separate dumping apparatus for each bin. Furthermore, these old dumping apparatus occupy space below the driveway that could be advantageously used for other purposes.

One of the objects of the present invention is to produce an improved dumping apparatus movable over the driveway to many different locations where it can be used to unload the vehicles, thereby providing a single dumping apparatus whereby vehicles may be unloaded at many different bins, or sinks.

A further object is to produce a highly efficient apparatus of this kind having its various elements combined with each other to very effectively obtain the desired results. It will also be noted that a portable unloading apparatus of this kind can be located entirely above the driveway, and that it need not occupy any space which could be conviently used for bins, or the like, below the driveway.

With the foregoing and other objects in iew, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a side elevation, partly in section, illustrating a dumping apparatus embodying the features of this invention and also showing a number of bins located below the driveway, together with a vehicle discharging its contents into one of the bins.

Fig. II is a front elevation of the dumping apparatus.

Fig. III is a top or plan view of a portion of the carriage whereby the dumping apparatus is supported.

Fig. IV is a diagrammatical view illustrating the manner in which the flexible suspension members are looped to pass around certain pulleys on the carriage.

Fig. V is a plan view of a portion of the vertically movable seat adapted to receive the front wheels of the vehicle.

Fig. VI is an enlarged transverse section illustrating the pivotal connection between two members of the vehicle seat.

Fig. VII is an enlarged section illustrating the manner in which the yielding feet are secured to the vehicle seat.

A designates bins, or sinks, beneath a floor or driveway B, each bin having an inlet opening 1 adapted to be closed by a door 2 as shown in Fig. I.

To illustrate a suitable vertically movable seat for front portions of the vehicle, I have shown a pair of frames C adapted to receive the front wheels of the vehicle, each frame C being in the form of a loop having a pair of wheel-engaging members 3 separated from each other as shown in Fig. V. Vertical arms 5, rigidly secured to the frames C, are provided with horizontally disposed loops 6 at their upper ends. 7 designates friction members, preferably rubber feet, extending downwardly from the vehicle seat and adapted to engage the driveway B, as shown in Fig. II. When the vehicle seat occupies its lowermost position (Fig. II), the front wheels of the vehicle will readily pass onto the seat frames C, and the rubber members 7 will then frictionally engage the driveway to prevent accidental slippage of the seat. These rubber members 7 also serve as sound deadeners when the seat is dropped onto the driveway and the yielding rubber will permit adjustment of the seat to an irregular driveway when the front wheels of the vehicle pass onto the seat. 7' designates bolts whereby the rubber members are secured as shown in Figs. V and VII.

As an additional means for permitting adjustment of the seat to an irregular driveway, I have shown a bolt 8 forming a pivotal connection between the seat frames C and anti-friction bearings surrounding said bolt. These bearings are shown in Figs. II, V and VI. Each bearing includes a ring 9 perforated to receive balls which engage raceway members. The pivot bolt 8 passes through both rings 9, and one of these ball confining rings is located between the seat frames C, while the other ring 9 lies between the head of bolt 8 and the end member of one of the seat frames. This end member lies between the ball bearings, so the seat frames are free to turn about the axis of the pivot bolt, even though the nuts on the bolt are tightened to securely connect the seat frames. By connecting the seat frames in this manner, I have provided a flexible seat which will readily adjust itself to an irregular driveway, and the flexible seat will be firmly supported on the four rubber feet 7.

The means for elevating the vehicle seat includes a pair of flexible suspension members 11 and 11' having their lower ends secured to the vehicle seat, said flexible suspension members being in the form of cables separated from each other to lie at opposite sides of the vehicle. The lower ends of these cables may be attached to lower portions of the arms 5, as shown in Fig. II.

To provide a portable support for the vehicle seat and its elevating means, I preferably utilize a horizontally movable carriage arranged above the vehicle seat so as to lie above the front end of the vehicle. This carriage may include longitudinal frame members 13 arranged parallel with the vehicle seat, transverse members 14 and 15 connecting said longitudinal members, hangers 16 connected to the ends of this carriage frame, and rollers 17 mounted on said hangers, said rollers being seated on horizontal tracks 18'.

Both of the cables 11 and 11' should be elevated at the same time and at the same speed, and this can be conveniently accomplished by the use of a single prime mover for both cables. As an illustration of this feature I have shown a horizontal cylinder 18 secured to the frame members 13 of the carriage, a piston 19 in said cylinder, a piston rod 20 fixed to said piston, and a double pulley 21 rotatably mounted in the outer end of piston rod 20. 22 designates a double pulley secured to a shaft 23, the latter being mounted in bearings 24 fixed to the frame members 13. A pulley 25 (Fig. II) is rotatably mounted in bearings 26 depending from and fixed to the longitudinal frame members 13. The arrangement of the pulleys and cables is shown by Figs. II, III and IV. The upper ends of both cables 11 and 11' are attached to one of the transverse frame members 15 while the lower ends of the cables are attached to the vertically movable seat frame. The cable 11' extends upwardly from the vertically movable frame to the pulley 22, thence over said pulley 22 and around the pulley 21 to the adjacent frame member 15 where its upper end is secured. The cable 11 extends upwardly from the vertically movable frame, thence over the pulley 25 from which it passes in a horizontal direction to the pulley 22, said cable 11 being provided with a loop which surrounds both of the pulleys 21 and 22. The arrangement of the loops in the cables is best illustrated by Fig. IV, each cable being looped around pulleys 21 and 22, so that the vehicle seat may be elevated by moving the pulley 21 to the left from the position shown in Fig. II.

Any suitable fluid under pressure for example compressed air, may be delivered to and discharged from the cylinder 18 through the medium of fluid conductors 27 at the ends of said cylinder. It will be readily understood that the piston 19 may be operated through the medium of this fluid under pressure, with the result of shifting the pulley 21 to either raise or lower the cables 11 and 11' from which the vehicle seat is suspended.

28 designates rigid vertical guides depending from and rigidly secured to the carriage on which the prime mover is mounted, said guides 28 being separated from each other so as to lie on opposite sides of the vehicle when the front wheels rest upon the seat frames C.

The loops 6 surround the rigid guides 28 to provide loose connections between said guides and the vehicle seat. A connection of this kind will permit adjustment of the vehicle seat on an irregular driveway. However, when the vehicle seat is engaged with the driveway it is desirable to locate said seat in a central position relative to the rigid guides 28, and for this reason the lower ends of said rigid guides may be provided with tapering deflectors 29 (Figs. I, II and V) adapted to engage the loops 6. While the seat is moving downwardly, the loops 6 engage the inclined faces of the deflector ribs 29 immediately before the seat reaches the driveway, and as the seat continues its downward motion it is shifted to a position symmetrical with the rigid guides 28.

Although the seat frames are automatically adjusted by the deflectors 29, it is to be understood that the vehicle wheels will not be accurately adjusted on the driveway to points midway between the wheel engaging members 3. In actual practice, the vehicle will be stopped on the driveway whenever its front wheels engage the roadway at points surrounded by the seat frames C, and these points will very seldom coincide with the longitudinal center line of the seat frames. In many instances, one wheel of the vehicle will lie very close to the front portion of the seat frame, while the other wheel is located near the rear of the frame. Consequently, when the seat is elevated to engage the wheels, one end of the seat will ordinarily be thrown forwardly while the opposite end is thrown rearwardly, and the wheel-engaging members 3 will then properly engage the vehicle wheels. An automatic adjustment of this kind is permitted by the loops 6 which loosely surround the rigid guides 28.

To fully understand the automatic adjustment just referred to, it should be noted that the centering device, formed by inclined deflectors 29, becomes effective while the vehicle seat is moving downwardly and immediately before the seat reaches the driveway. At this time, the seat frames are disengaged from the circular tread of the wheels. Thereafter, when the seat frames are elevated to engage the wheels of another vehicle, these frames will usually rise a few inches to release the loops 6 from the deflectors 29 before the vehicle seat contacts with the wheels, and each end of the vehicle seat will then be free to move either forwardly or backwardly to properly engage the wheels. The vehicle seat is thus primarily adjusted to lie on the driveway in a position symmetrical with the rigid vertical guides 28, and thereafter, this seat is permitted to adjust itself in either direction by contacting with the circular treads of the wheels. The object is to locate the wheel engaging members 3 in approximately the same horizontal plane, as shown by Fig. I. However, the seat frames may be tilted a limited distance without releasing the wheels.

It is desirable to pivotally connect the seat frames as shown at 8 and 9 for the purpose of permitting adjustment of the wheel seat on an irregular driveway, but the pivotal movement at this point must be limited for the frames C would otherwise be permitted to turn on the pivot and release the vehicle wheels. These wheels turn freely on their axle, and if the seat frames C were likewise free to turn an unlimited degree on the axis of pivot 8, the flexible seat frame would not provide a substantial support for the vehicle. Therefore, the lower ends of the flexible cables 11 and 11' are connected to the rigid arms 5 at points between the loops 6 and the pivotally connected seat frames C. When the seat frames are suspended by the flexible cables to support the vehicle, the loops 6 will cooperate with the rigid guides 28 to limit pivotal movement at the pivot bolt 8, so the pivotally connected seats are suspended by flexible cables without liability of releasing the wheels from the seats.

Since it is unnecessary to locate any of the elements of the dumping apparatus at points below the floor or driveway B (Fig. I) all of the space below the driveway may be used for some other purpose. It is frequently very desirable to locate a number of shallow bins A very close to each other as shown in Fig. I, and this can be done in a grain elevator equipped with the new dumping apparatus. A single portable dumping apparatus of this kind can be easily moved from one location to another for the purpose of unloading vehicles at many different points.

When the vehicle is to be unloaded, its front portion lies between the suspension members 11 and 11' and the front wheels of the vehicle rest upon the seat frames C. After the wheels have been properly positioned on these seat frames, the vehicle seat may be elevated a slight distance to clear the driveway, and thereafter, the vehicle may be driven by its own power to accurately locate the rear end of the vehicle body at the desired position above the selected inlet opening 1. While the vehicle is being adjusted in this manner, its front wheels are securely held in the seat frames C, and the carriage of the dumping apparatus will move with the vehicle. This is an advantage in accurately locating the vehicle and dumping apparatus in the most desirable positions for dumping and it will be readily understood that the vehicle itself may be used as a means for moving the entire dumping apparatus from one point to another, or from one dumping position to another. If the vehicle is a motor truck, the rear wheels thereof would be driven by the motor to propel both the vehicle and the dumping apparatus, and if the vehicle is drawn by horses the latter could be used in moving both the vehicle and dumping apparatus. During such movements, the front portion of the vehicle is supported by the suspended vehicle seat, and the loops 6 will engage the rigid vertical guides 28 to transmit movement to the carriage of the dumping apparatus.

After the vehicle has been properly located in the desired dumping position, the prime mover including piston 19 is operated to elevate the vehicle seat, thereby lifting the front portion of the vehicle to discharge its contents at the rear as shown in Fig. I. At this time the brakes may be applied to the rear wheels of the vehicle. It will be interesting to observe a peculiar action which occurs during the upward and downward movements of the vehicle seat. The rear wheels of the vehicle being prevented from slipping on the driveway, the front wheels will rise or fall in an arc of a circle the center of which will lie at the center of the rear wheels. During these movements, the rigid guides 28 remain in vertical positions while the vehicle seat moves in an arc of a circle with the front portion of the vehicle, and as a consequence, the loops 6 cooperate with the rigid vertical guides 28 to impart a horizontal movement to the carriage of the dumping apparatus.

Although the vehicle is tilted during the dumping operation, it is not placed on an inclined plane and it does not tend to move backwardly or downwardly. The seat frames C prevent accidental slippage of the front wheels of the vehicle, and if desired the rear wheels may be easily held by the brakes or by some obstruction in the driveway.

In a grain elevator it is an advantage to use a number of temporary storage bins, or sinks A, wherein different grades of grain or different kinds of grain may be conveniently dumped for temporary storage and thereafter elevated to the main storage bins, it being unnecessary to operate the main elevator at frequent intervals for the purpose of emptying the temporary storage bins. Heretofore, the practice has been to employ a separate dumping apparatus for each bin A, and as a consequence it was not economical to have a very large number of these bins, so it frequently became necessary to start and stop the main elevator to empty the temporary storage bin. By using my simple portable dumping apparatus, many different bins A can be conveniently used to receive large quantities of grain, and the expense and trouble of frequently starting and stopping the main grain elevator is thus eliminated.

The elongated vehicle seat, including wheel receiving frames C arranged transversely of the driveway, is adapted to receive vehicle wheels of any gage, either wide or narrow, and a vehicle of any length may be properly unloaded by the portable dumping apparatus. The vehicle to be unloaded may enter from either side of the apparatus which is open at both sides to receive the front of the vehicle.

I claim:

1. In a vehicle dumping apparatus, a pair of suspension members separated from each other so as to lie at opposite sides of the vehicle, a vehicle seat supported by said suspension members and extending from one of said suspension members to the other, said vehicle seat being adapted to receive the front wheels of the vehicle, and said seat being flexible to permit adjustment thereof on an irregular driveway, and elevating means whereby said suspension members are elevated simultaneously to lift said vehicle seat.

2. In a vehicle dumping apparatus, a pair of suspension members separated from each other so as to lie at opposite sides of the vehicle, a vehicle seat supported by said suspension members and extending from one of said suspension members to the other, said vehicle seat comprising a pair of wheel receiving members forming seats for the front wheels of the vehicle and a flexible connection uniting said wheel receiving members, and elevating means whereby said suspension members are elevated simultaneously to lift the vehicle seat.

3. In a vehicle dumping apparatus, a pair of suspension members separated from each other so as to lie at opposite sides of the vehicle, a vehicle seat supported by said suspension members and extending from one of said suspension members to the other, said vehicle seat comprising a pair of wheel receiving members forming seats for the front wheels of the vehicle and a pivotal connection uniting said wheel receiving members, and elevating means whereby said suspension members are elevated simultaneously to lift the vehicle seat.

4. In a vehicle dumping apparatus, a seat for front portions of the vehicle, a carriage movably mounted above said seat so as to lie above the front end of the vehicle, rigid vertical guides depending from said carriage and cooperating with said seat, suspension members supporting said seat, said suspension members being separated from each other so as to lie at opposite sides of the vehicle, and elevating means whereby said suspension members are elevated simultaneously to lift said seat, said elevating means being supported by said carriage.

5. In a vehicle dumping apparatus, a carriage, rigid vertical guides depending from said carriage, said vertical guides being separated from each other so as to lie at opposite sides of the vehicle, a vehicle seat guided by said vertical guides, said seat being adapted to receive front portions of the vehicle and said carriage being mounted above said seat so as to lie above the front end of the vehicle, flexible suspension members supporting said seat, said suspension members being separated from each other to lie at opposite sides of the vehicle, and elevating means whereby said flexible suspension members are elevated simultaneously, said elevating means being supported by said carriage.

6. In a vehicle dumping apparatus, a carriage, rigid vertical guides depending from said carriage, said vertical guides being separated from each other so as to lie at opposite sides of the vehicle, a vehicle seat adapted to receive the front wheels of the vehicle, said seat being provided at its ends with guide-receiving members cooperating with said rigid vertical guides, flexible suspension members supporting said seat, said suspension members being separated from each other to lie at opposite sides of the vehicle, and elevating means whereby said flexible suspension members are elevated simultaneously, said elevating means being supported by said carriage.

7. In a vehicle dumping apparatus, a carriage, rigid vertical guides depending from said carriage, said vertical guides being separated from each other so as to lie at opposite sides of the vehicle, a vehicle seat adapted to receive the front wheels of the vehicle, said seat being provided at its ends with guide-receiving members cooperating with said rigid vertical guides, flexible suspension members supporting said seat, said suspension members being separated from each other to lie at opposite sides of the vehicle, and elevating means whereby said flexible suspension members are elevated simultaneously, said elevating means being supported by said carriage, said seat being loosely secured to said rigid guides to permit adjustment of the seat on an irregular driveway.

8. In a vehicle dumping apparatus, a carriage, rigid vertical guides depending from said carriage, said vertical guides being separated from each other so as to lie at opposite sides of the vehicle, a vehicle seat adapted to receive the front wheels of the vehicle, said seat being provided at its ends with guide-receiving members cooperating with said rigid vertical guides, flexible suspension members supporting said seat, said suspension members being separated from each other to lie at opposite sides of the vehicle, and elevating means whereby said flexible suspension members are elevated simultaneously, said elevating means being supported by said carriage, said flexible suspension members having their lower ends attached to end portions of said seat, and said seat being provided with end extensions loosely secured to said vertical guides.

9. In a vehicle dumping apparatus, a carriage, rigid vertical guides depending from said carriage, said vertical guides being separated from each other so as to lie at opposite sides of the vehicle, a vehicle seat guided by said vertical guides, said seat being adapted to receive front portions of the vehicle and said carriage being mounted above said seat so as to lie above the front end of the vehicle, flexible suspension members supporting said seat, said suspension members being separated from each other to lie at opposite sides of the vehicle, and elevating means whereby said flexible suspension members are elevated simultaneously, said elevating means being supported by said carriage, said vehicle seat being provided with upwardly extending end members loosely secured to said vertical guides.

10. In a vehicle dumping apparatus, a carriage, rigid vertical guides depending from said carriage, said vertical guides being separated from each other so as to lie at opposite sides of the vehicle, a vehicle seat adapted to receive the front wheels of the vehicle, said seat being provided at its ends with guide-receiving members cooperating with said rigid vertical guides, flexible suspension members supporting said seat, said suspension members being separated from each other to lie at opposite sides of the vehicle, and elevating means whereby said flexible suspension members are elevated simultaneously, said elevating means being supported by said carriage, said seat being loosely secured to said rigid guides to permit adjustment of the seat on an irregular driveway and a centering device cooperable with said carriage guides to locate the loosely secured seat in a central position relative to said guides.

11. In a vehicle dumping apparatus, a carriage, rigid vertical guides depending from said carriage, said vertical guides being separated from each other so as to lie at opposite sides of the vehicle, a vehicle seat adapted to receive the front wheels of the vehicle, said seat being provided at its ends with guide-receiving members cooperating with said rigid vertical guides, flexible suspension members supporting said seat, said suspension members being separated from each other to lie at opposite sides of the vehicle, and elevating means whereby said flexible suspension members are elevated simultaneously, said elevating means being supported by said carriage, said seat being loosely secured to said rigid guides to permit adjustment of the seat on an irregular driveway and a centering device cooperable with said rigid guides to locate the loosely secured seat in a central position relative to said guides, said centering device including tapering deflectors secured to the lower portions of said rigid guides so as to cooperate with said seat when the latter is seated on the driveway.

12. In a vehicle dumping apparatus, a pair of suspension members separated from each other so as to lie at opposite sides of the vehicle, a vehicle seat supported by said suspension members and extending from one of said suspension members to the other, said vehicle seat being adapted to receive the front wheels of the vehicle, yieldable members carried by said vehicle seat and adapted to engage the driveway, elevating means whereby said suspension members are elevated simultaneously, and a carriage supporting said elevating means.

13. In a vehicle dumping apparatus, a pair of suspension members separated from each other so as to lie at opposite sides of the vehicle, a vehicle seat supported by said suspension members and extending from one of said suspension members to the other, said vehicle seat being adapted to receive the front wheels of the vehicle, rubber feet carried by said vehicle seat and adapted to engage the driveway, elevating means whereby said suspension members are elevated simultaneously, and a carriage supporting said elevating means.

14. In a vehicle dumping apparatus, seats for front portions of the vehicle, a carriage movably mounted above said seats so as to lie above the front end of the vehicle, suspension members supporting said seats, said suspension members being separated from each other so as to lie at opposite sides of the vehicle, and elevating means whereby said suspension members are elevated simultaneously, said elevating means including a prime mover supported by said carriage and means whereby motion is transmitted from said prime mover to said suspension members.

15. In a vehicle dumping apparatus, a pair of suspension members separated from each other so as to lie at opposite sides of the vehicle, a vehicle seat supported by said suspension members, a horizontally movable carriage arranged above said vehicle seat so as to lie above the vehicle, said vehicle seat being at a right angle to the path of said horizontally movable carriage and said suspension members being secured to the ends of said seat, and elevating means whereby said suspension members are elevated simultaneously, said elevating means including a prime mover supported by said carriage and means whereby motion is transmitted from said prime mover to said suspension members.

16. In a vehicle dumping apparatus, a pair of flexible suspension members separated from each other so as to lie at opposite sides of the vehicle, a vehicle seat supported by said flexible suspension members, a horizontally movable carriage arranged above said vehicle seat so as to lie above the vehicle, and elevating means whereby said flexible suspension members are elevated simultaneously, said elevating means including a prime mover supported by said carriage and pulleys mounted on said carriage to guide both of said flexible suspension members to said prime mover.

17. In a vehicle dumping apparatus, a pair of flexible suspension members separated from each other so as to lie at opposite sides of the vehicle, a vehicle seat supported by said flexible suspension members, a horizontally movable carriage arranged above said vehicle seat so as to lie above the vehicle, and elevating means whereby said flexible suspension members are elevated simultaneously, said elevating means including a prime mover comprising a piston and cylinder supported by said carriage and means whereby motion is transmitted from said piston to both of said flexible suspension members.

18. In a vehicle dumping apparatus, a pair of flexible suspension members separated from each other so as to lie at opposite sides of the vehicle, a vehicle seat supported by said flexible suspension members, a horizontally movable carriage arranged above said vehicle seat so as to lie above the vehicle, and elevating means whereby said flexible suspension members are elevated simultaneously, said elevating means including a prime mover comprising a piston and cylinder supported by said carriage, a pulley carried by said piston, and guide pulleys mounted on said carriage to direct said flexible suspension members to the first mentioned pulley.

19. In a vehicle dumping apparatus, a vehicle seat comprising a pair of wheel receiving members forming seats for the front wheels of the vehicle, a flexible connection uniting said wheel receiving members to permit adjustment thereof on an irregular driveway, and elevating means whereby said wheel receiving members are elevated simultaneously.

20. In a vehicle dumping apparatus, a vehicle seat comprising a pair of wheel receiving members forming seats for the front wheels of the vehicle, a flexible connection uniting said wheel receiving members to permit adjustment thereof on an irregular driveway, said flexible connection including a pivot connecting said wheel receiving members and an anti-friction bearing surrounding the axis of said pivot to allow free relative movement of said wheel receiving members, and elevating means whereby said wheel receiving members are elevated simultaneously.

21. In a vehicle dumping apparatus, a vehicle seat comprising a pair of wheel receiving members forming seats for the front wheels of the vehicle, a flexible connection uniting said wheel receiving members to permit adjustment thereof on an irregular driveway, said flexible connection including a pivotal connection uniting said wheel receiving members and a pair of anti-friction bearings surrounding the axis of said pivot, a portion of one of said wheel receiving members being interposed between and in contact with said antifriction bearings, and elevating means whereby said wheel receiving members are elevated simultaneously.

22. In a vehicle dumping apparatus, a vehicle seat comprising a pair of wheel receiving members forming seats for the front wheels of the vehicle, a flexible connection uniting said wheel receiving members to permit adjustment thereof on an irregular driveway, means for limiting the relative movements of the wheel receiving members, and elevating means whereby said wheel receiving members are elevated simultaneously.

23. In a vehicle dumping apparatus, a vehicle seat comprising a pair of wheel receiving members forming seats for the front wheels of the vehicle, a flexible connection uniting said wheel receiving members to permit adjustment thereof on an irregular driveway, rigid vertical guides for said wheel receiving members, means cooperating with said guides to limit the relative movements of said wheel receiving members, and elevating means whereby said wheel receiving members are elevated simultaneously.

24. In a vehicle dumping apparatus, a vehicle seat comprising a pair of wheel receiving members forming seats for the front wheels of the vehicle, a flexible connection uniting said wheel receiving members to permit adjustment thereof on an irregular driveway, said flexible connection including a pivot device connecting said wheel receiving members, rigid vertical guides for said wheel receiving members, each of said wheel receiving members having an extension provided with a loop loosely surrounding said guides, flexible suspension members connected at points between said loops and the wheel seats, and elevating means whereby said flexible suspension members are elevated simultaneously.

25. In a vehicle dumping apparatus, a vehicle seat adapted to engage the driveway to receive the front wheels of the vehicle, and elevating means flexibly connected to said wheel seat to permit said seat to adjust itself to the wheels, said elevating means including flexible cables connected to the end portions of said vehicle seat and rigid vertical guides to which said vehicle seat is loosely secured.

26. In a vehicle dumping apparatus, a vehicle seat adapted to engage the driveway to receive the front wheels of the vehicle, and elevating means flexibly connected to said wheel seat to permit said seat to adjust itself to the wheels, said elevating means including flexible cables connected to the end portions of said vehicle seat and rigid vertical guides to which said vehicle seat is loosely secured, said vehicle seat being provided with oppositely disposed wheel engaging members separated from each other to receive the lower portions of the wheels, and said wheel engaging members being adapted to cooperate with the treads of the wheels to automatically adjust the vehicle seat relative to the wheels.

In testimony that I claim the foregoing I hereunto affix my signature.

RICHARD C. STONE.